(12) United States Patent
Renyer et al.

(10) Patent No.: US 9,392,739 B2
(45) Date of Patent: Jul. 19, 2016

(54) BATCH SEED COATING APPARATUS

(71) Applicant: USC, L.L.C., Sabetha, KS (US)

(72) Inventors: Greg Renyer, Sabetha, KS (US); Jim Renyer, Sabetha, KS (US)

(73) Assignee: USC, LLC, Sabetha, KS (US)

( * ) Notice: Subject to any disclaimer, the term of this patent is extended or adjusted under 35 U.S.C. 154(b) by 36 days.

(21) Appl. No.: 14/282,868

(22) Filed: May 20, 2014

(65) Prior Publication Data

US 2015/0334911 A1    Nov. 26, 2015

(51) Int. Cl.
*A23G 3/26* (2006.01)
*B05C 3/00* (2006.01)
*A01C 1/06* (2006.01)

(52) U.S. Cl.
CPC .................................. *A01C 1/06* (2013.01)

(58) Field of Classification Search
CPC ........................................................ A21C 15/02
USPC .................. 118/13–31, 303; 426/89, 93, 309; 366/102, 289; 47/57.6, DIG. 9
See application file for complete search history.

(56) References Cited

U.S. PATENT DOCUMENTS

| 3,155,542 | A | * | 11/1964 | Cordell | .................... A01C 1/00 118/303 |
| 3,589,684 | A | | 6/1971 | Dixon | |
| 4,370,945 | A | * | 2/1983 | Beckschulte | ........... B29C 45/26 118/303 |
| 4,581,242 | A | * | 4/1986 | Forster | .................... A61J 3/005 118/19 |
| 2008/0181050 | A1 | * | 7/2008 | Basten | ...................... B01F 3/18 366/102 |

FOREIGN PATENT DOCUMENTS

| GB | 251205 | 4/1926 |
| GB | 2258831 A | 2/1993 |

OTHER PUBLICATIONS

International Search Report and Written Opinion, dated Jun. 9, 2015, in PCT/US2015/019965, international Filing Date Mar. 11, 2015.

* cited by examiner

*Primary Examiner* — Yewebdar Tadesse
(74) *Attorney, Agent, or Firm* — Hovey Williams LLP

(57) ABSTRACT

A batch-type particulate treating apparatus (10) includes an upright bin or hopper (20) equipped with a central, rotatable lifting augur (68) having a bored shaft (70) and helical flighting (80, 82). Coating liquid passes through the bore (72) of shaft (70), and is delivered through ejectors (86, 88) mounted on the augur flighting (80, 82). A pneumatic assembly (16) serves to direct pressurized air upwardly through a clearance (96) between the augur base and the adjacent inner surfaces of hopper (20). In operation, liquid coating material is ejected into the particulates during rotation of the augur (68) and operation of the pneumatic assembly (16), in order to uniformly and efficiently coat the particulates. The apparatus (10) is particularly designed for treating of seeds.

11 Claims, 3 Drawing Sheets

BATCH SEED COATING APPARATUS

BACKGROUND OF THE INVENTION

1. Field of the Invention

The present invention is broadly concerned with particulate coaters designed to rapidly and efficiently coat batches of particulate matter, especially. More particularly, the invention is concerned with batch seed coaters having an upright, pneumatic, live-bottom seed bin equipped with a central rotatable augur and apparatus for delivering coating liquid into the mass of the seed batch below the upper surface thereof; preferably the augur shaft has a central bore to receive the coating liquid, which is dispersed into the seed mass by ejectors located on the augur flighting.

2. Description of the Prior Art

In agriculture and horticulture, seeds are commonly treated with pesticidal chemical(s), typically, antimicrobial, fungicidal, bactericidal, and/or insecticidal agents prior to planting of the seeds. Seed treatments of this type can be more environmentally friendly than direct application of these agents to the soil adjacent seeds. A number of seed treaters have been developed for large-scale seed treatment, such as the LP and LPX treaters commercialized by USC, L.L.C. of Sabetha, Kans. Such seed treaters may be continuous or batch-type, but must be capable of evenly and uniformly treating seeds of various types.

However designed, it is important that seed treaters avoid crushing or otherwise breaking seeds during the treatment process. This is significant, not only from the standpoint of seed loss, but also because of the possibility that the treating equipment may jam up if seeds become lodged within the interstices of the equipment. At the same time, the equipment must have sufficient throughput to meet commercial needs.

SUMMARY OF THE INVENTION

The present invention provides an improved batch coater for particulate material, and especially seeds, which is capable of evenly and efficiently coating particulates without damage thereto or hangup within the coating apparatus. Generally speaking, the treating apparatus of the invention comprises an upright particulate bin with an upright, axially rotatable augur located within the bin for swirling and agitating particulates during coating operations. The overall apparatus further includes structure for delivery of a liquid coating material into the confines of the bin, below the upper surface thereof. A selectively openable outlet is also provided to allow egress of coated particulates from the bin.

In preferred forms, the augur shaft has an axial bore and at least one outlet is in communication with the bore. In this form, coating liquid is delivered from a source for passage through the augur bore and discharge through the outlet. Advantageously, a pair of opposed outlets are mounted on the augur flighting in a spaced relationship to the augur shaft.

In another aspect of the invention, a pneumatic assembly is employed for creating a live-bottom bin, which serves to further agitate the particulates during augur rotation and coating. The pneumatic assembly is designed to deliver pressurized air at the base of the bin, and particularly through a continuous clearance between the base of the augur and adjacent surfaces of the bin.

In actual practice, the preferred coating delivery and live-bottom features are both incorporated into the treaters of the invention. The treaters are especially designed for handling and treating of seeds of all types.

DETAILED DESCRIPTION OF THE PREFERRED EMBODIMENT

Figure 1:
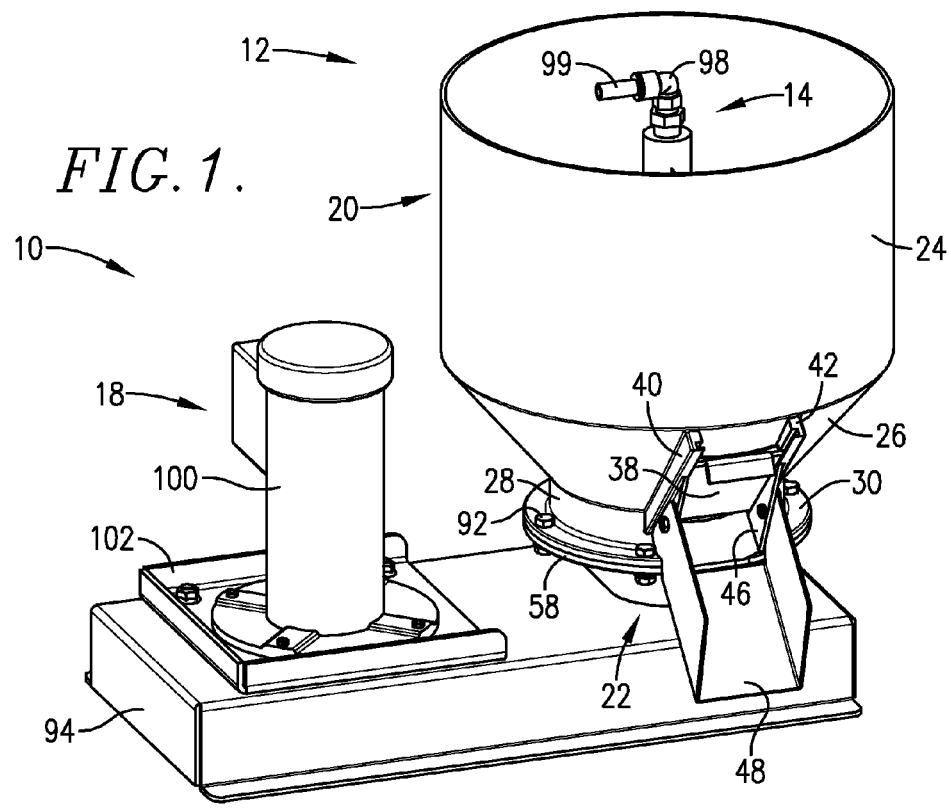
FIG. 1 is a top perspective view of a seed coater in accordance with the invention.
Figure 2:
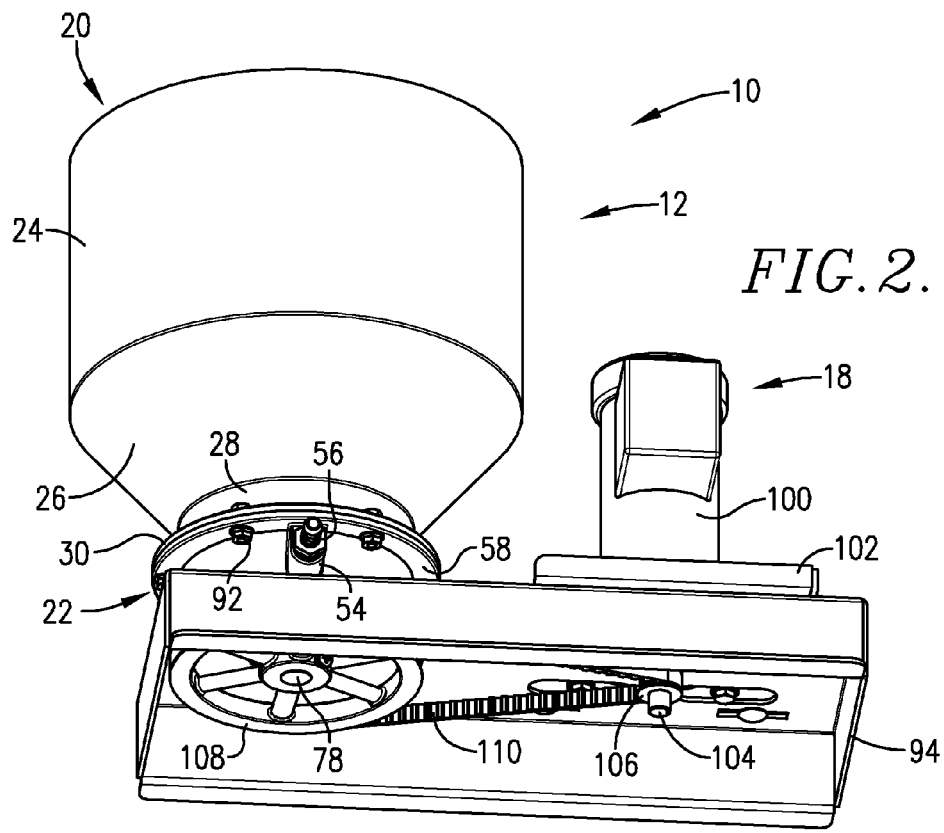
FIG. 2 is a bottom perspective view of the seed coater.
Figure 3:
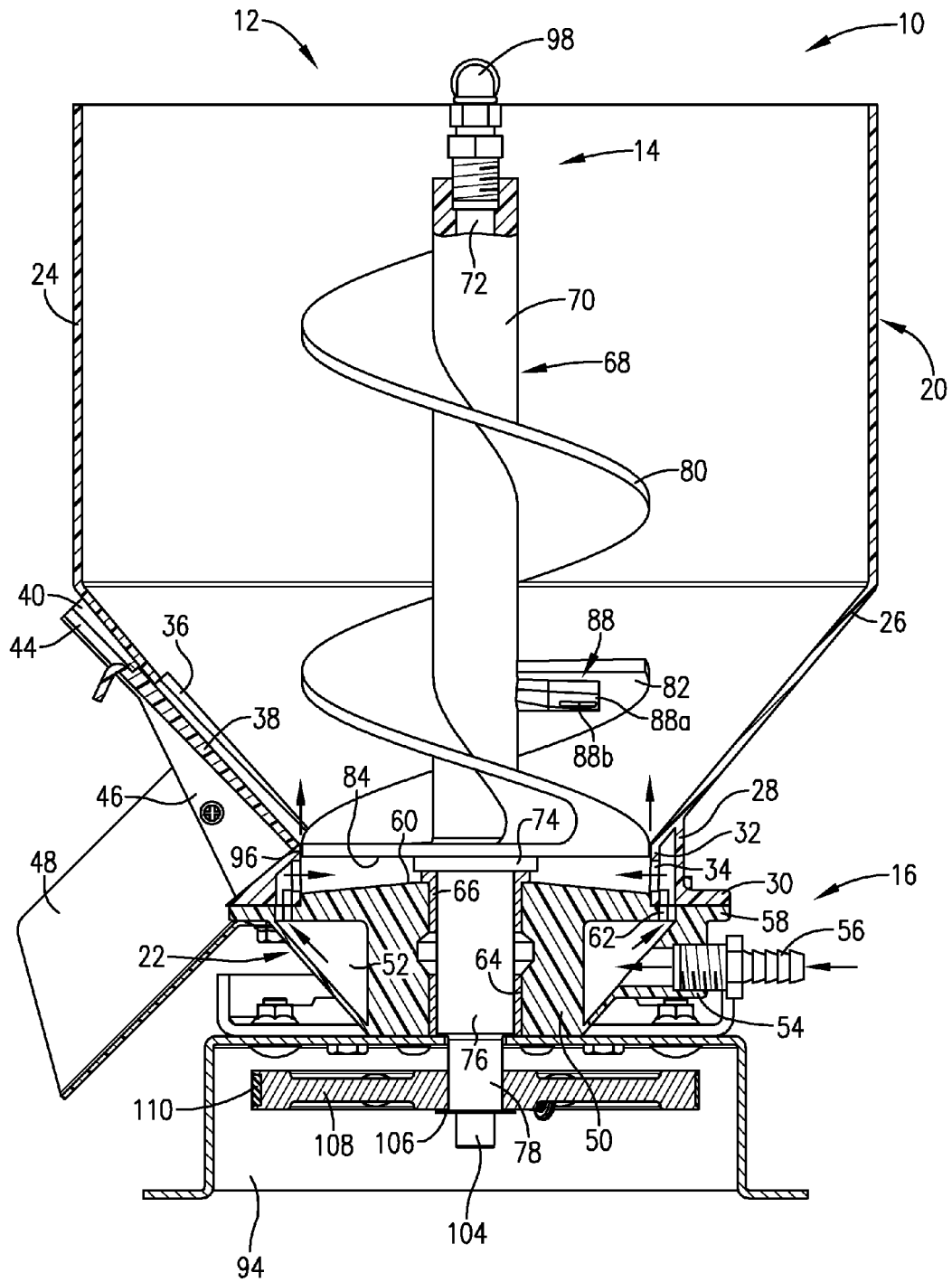
FIG. 3 is a vertical sectional view of the seed coater illustrating in detail the housing, liquid coating, and pneumatic assemblies thereof.

Turning now to the drawings, a seed coater 10 is illustrated in FIGS. 1-3 and broadly includes a hopper assembly 12, a liquid seed coating assembly 14, a pneumatic assembly 16, and a drive assembly 18. Generally speaking, seed coater 10 is designed to receive batches of seeds, to efficiently coat the batches, and to deliver uniformly coated and dried seeds for planting.

Figure 4:
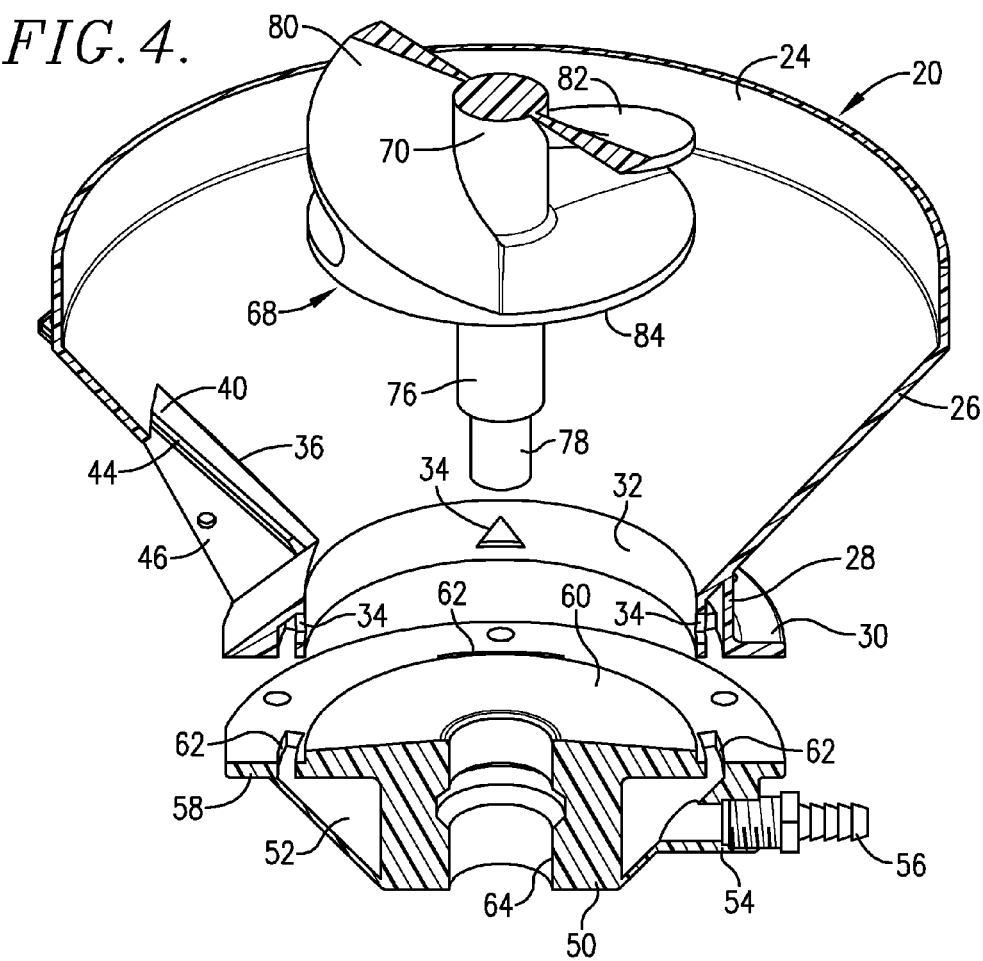
FIG. 4 is a fragmentary perspective sectional view of the housing assembly, with the augur and seed hopper in exploded relation to the hopper base.
Figure 5:
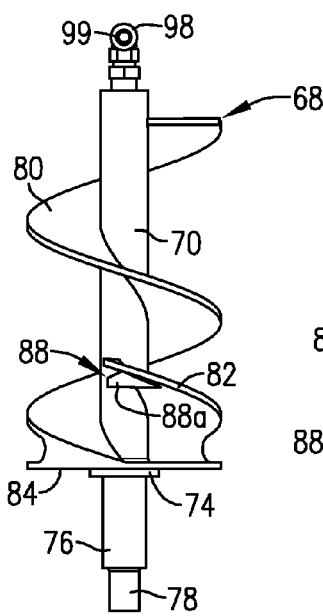
FIG. 5 is an elevational view of the dual-flight augur forming a part of the liquid coating assembly.

The hopper assembly 12 is of unitary construction generally comprises an upright, open-top bin or hopper 20 and a lower supporting base 22. The hopper 20 includes an uppermost circular wall 24, a lower frustoconical wall 26, and a lowermost circular, depending wall 28 equipped with a radially outwardly extending flange 30. The hopper is also equipped with an inner depending wall 32 (FIGS. 3-4) spaced from wall 28 and having a total of four equally circumferentially spaced triangular openings 34 therethrough. The frustoconical wall 26 also has a seed outlet opening 36 formed therein, which is normally covered and closed by a slidable gate member 38. A pair of spaced apart guide rails 40, 42 are affixed to the outer face of wall 26 on opposite sides of opening 36. The guides have opposed slots 44 which receive the gate member 38. The rails are also equipped with lower, generally triangular gussets 46. An outlet chute 48 is secured to the gussets 46, and serves to direct coated seed from opening 36 when gate member 38 is opened.

The base 22 is in the form of a frustoconical body 50 having a substantially triangular in cross-section circular air flow passageway 52 formed therein. As best seen in FIG. 3, an internally threaded tubular extension 54 is provided in communication with passageway 52. The extension 54 is designed to receive a conventional air nipple 56. The uppermost face of body 50 has a radial flange 58 designed to mate with flange 30, as well as an inner sloped surface 60. A circular air passageway 62 is provided so as to direct pressurized air from the passageway 52 and into the circular channel defined by the walls 28 and 32. Finally, the base 22 includes a central bore 64 having bearing structure 66 installed therein.

Figure 7:
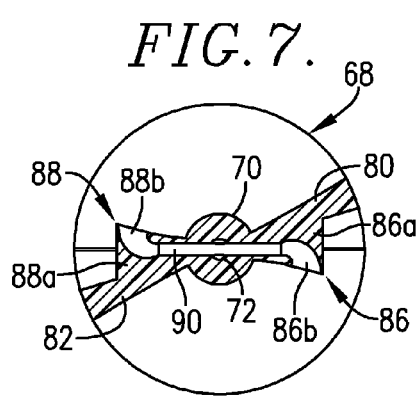
FIG. 7 is an enlarged sectional view taken along line 7-7 of FIG. 6, and illustrating the coating liquid ejectors.
Figure 6:
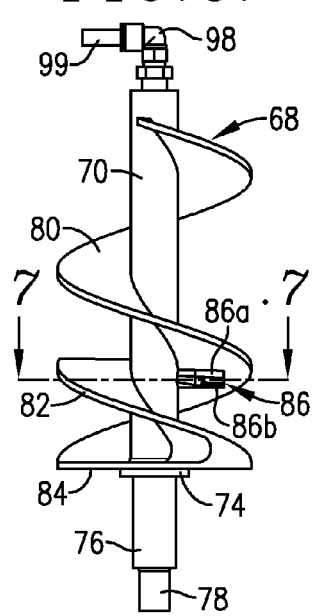
FIG. 6 is an elevational view similar to that of FIG. 5, but illustrating the augur rotated 90° relative to the illustration of FIG. 5.

The seed coating assembly 14 includes an upright, axially rotatable augur 68 having a central shaft 70 provided with an elongated central bore 72 and a lower annular bearing plate 74 designed to engage the upper end of bearing structure 66. The lower end 76 of shaft 70 is situated within bearing structure 66 and has a drive segment 78 (FIG. 3). A first continuous augur flight 80 extends substantially the full length of shaft 70 from a point proximal to the upper end of the shaft to a termination at bearing plate 74. The augur also has a second half-flight 82 extending from the plate 74 for 180° upwardly. The bases of the flights 80, 82 cooperatively present a continuous lower surface 84 directly above the surface 60 of base 22. A pair of coating fluid ejectors 86 and 88 are located on opposed sections of the flights 80, 82. Referring to FIG. 7, it will be observed that each ejector is integrally formed with the corresponding flight and includes an outwardly protruding segment 86a, 88a, with an outlet passageway 86b, 88b. A transverse passageway 90 extends between and communicates the shaft bore 72 and the passageways 86b, 88b.

As is readily apparent, the hopper 20 is positioned above and secured to base 22 by means of bolts 92 passing through the mated flanges 30, 58, and the base 22 is in turn connected to an elongated channel 94. Moreover, the augur 68 is positioned within hopper assembly 12 with the lower shaft section 76 rotatably seated within bearing structure 66 and with the drive segment 78 extending into the confines of channel 94. Importantly, a small clearance 96 is provided between the outer periphery of the base of flights 80, 82 and the inner surface of the wall 28. A rotatable swivel joint coupler 98 is secured to the upper end of the augur shaft 70 in communication with the bore 72. A liquid coating material conduit 99 is connected to coupler 98 and to a source of seed coating liquid (not shown).

The pneumatic assembly 16 is designed to deliver pressurized air from a source through an air hose (not shown) operatively coupled with nipple 56. Such air passes into the passageway 52, whereupon the air passes upwardly through the circular opening 52 into the space between the walls 28 and 32. This air then passes through the openings 34 and into the space between the surfaces 60 and 84. Finally, the air then passes upwardly through the clearance 96 for delivery into the confines of hopper 20.

Drive assembly 18 includes a drive motor 100 secured to a mounting plate 102, with the latter attached to the upper face of channel 94; the motor 100 has a lower drive shaft 104 extending into the channel. The shaft 104 and segment 78 are equipped with positive drive pulleys 106, 108, and a drive belt 110 is trained about the pulleys, as illustrated in FIG. 2.

In the operation of coater 10, a charge of seed is first deposited into the hopper 20, with the gate 38 being closed. Next, the drive assembly 18 is actuated to rotate augur 70, and coating liquid is delivered via conduit 99 and coupler 98 into augur shaft bore 72. Such liquid passes downwardly through the bore 72 and then is sprayed outwardly through the outlet passageways 86b, 88b so as to coat the agitated and moving seeds within the hopper. Simultaneously, pressurized air is delivered through the passageway 62 and thence upwardly through the clearance 96 so as to further agitate the seeds and prevent seed fracture or blockage of the clearance 96. By virtue of these combined actions, the seed is swirled and lifted owing to the rotation of the augur 68 and passes upwardly adjacent the outer surface of augur shaft 70 until the upper end of augur 80 is reached, whereupon the seeds spread radially outwardly and then downwardly along the hopper walls 24 and 26. The pressurized air currents delivered through clearance 96 further agitates the seeds adjacent the base of the hopper and prevents any interference between the seeds and the operating surfaces of the treater. These seed movements assures that the seeds are uniformly coated to the desired extent. When the coating operation is complete, the delivery of coating liquid is terminated and the coater continues operation as before until the seeds are fully dried. At this point, the gate 38 can be lifted allowing the now-coated seeds to pass through the opening 36 and chute 48 for collection and use.

We claim:

1. A particulate treating apparatus operable to treat a batch of particulate material and comprising:
    an upright particulate bin;
    an upright, axially rotatable augur located within said upright particulate bin and including an elongated, axially bored shaft and outwardly extending helical flighting along the length of the axially bored shaft, said outwardly extending helical flighting presenting an upper end and a lower end, there being an outlet in communication with the axially bored shaft and the interior of said upright particutlate bin, said outlet located between said upper and lower ends of said outwardly extending helical flighting; and
    structure for delivery of a liquid coating material into the axially bored shaft, and for conveying the liquid through said outlet, in order to coat said batch of particulate material within said upright particular bin during rotation of said upright, axially rotatable augur,
    said upright particular bin and said upright, axially rotatable augur cooperatively configured to retain said batch of particulate material within said upright particular bin during said coating of the batch of particulate material, and to permit egress of the batch only after coating thereof.

2. The apparatus of claim 1, said upright particular bin having a selectively openable discharge outlet for said egress of said batch of coated particulate material.

3. The apparatus of claim 2, said discharge outlet for coated particulate material located above the lower end of said outwardly extending helical flighting.

4. The apparatus of claim 1, including a pneumatic assembly for delivery of pressurized air adjacent the lower end of said upright particular bin in order to agitate said particulate material.

5. The apparatus of claim 4, said upright, axially rotatable augur having a base, there being a clearance between said base and the adjacent inner surfaces of said upright particular bin, said pneumatic assembly operable to deliver said pressurized air through said clearance.

6. The apparatus of claim 1, said outlet being mounted on said flighting in spaced relationship to said axially bored shaft.

7. A particulate treating apparatus operable to treat a batch of particulate material and comprising:
    an upright particulate bin;
    an upright, axially rotatable augur located within said upright particular bin and including an elongated shaft and outwardly extending helical flighting along the length of the enlongated shaft, said outwardly extending helical flighting presenting an upper end and a lower end;
    structure including an outlet operable to deliver a liquid coating material into said batch of particulate material within said upright particular bin, said outlet located between said upper and lower ends of said helical flighting; and
    a pneumatic assembly operable to deliver pressurized air into said upright particular bin adjacent the lower end thereof in order to agitate the batch of particulate material within the upright particular bin during rotation of said augur and application of said coating material to said material,
    said upright particular bin and said upright, axially rotatable augur cooperatively configured to retain said batch of particulate material within said upright particular bin during said coating of the batch of particulate material, and to permit egress of the batch only after coating thereof.

8. The apparatus of claim 7, said elongated shaft having an axial bore, said outlet for said material in communication with said axial bore, and structure for delivery of said material to the enlongated shaft for delivery through said outlet.

9. The apparatus of claim 7, said upright, axially rotatable augur having a base, there being a clearance between said base and the adjacent inner surfaces of said upright particular bin, said pneumatic assembly operable to deliver said pressurized air through said clearance.

10. The apparatus of claim 9, said outlet being mounted on said flighting in spaced relationship to said enlongated shaft.

11. The apparatus of claim 7, including a discharge outlet for coated particulate material located above the lower end of said outwardly extending helical flighting.

* * * * *